March 23, 1954  M. C. HUTCHINSON  2,673,102
TOGGLE TYPE PIPE COUPLING
Filed Oct. 30, 1950

INVENTOR
MORTON C. HUTCHINSON,
BY
ATTORNEY

Patented Mar. 23, 1954

2,673,102

UNITED STATES PATENT OFFICE 2,673,102

TOGGLE TYPE PIPE COUPLING

Morton C. Hutchinson, New York, N. Y., assignor to Victaulic Company of America, New York, N. Y., a corporation of New Jersey Application October 30, 1950, Serial No. 192,937

1 Claim. (Cl. 285—129)

The present invention relates to a device for coupling the ends of adjoining pipes and the invention more particularly pertains to improvements in the manner in which two substantially rigid sections of the coupling are connected to each other.

One of the objects of the invention is to devise a pipe coupling so that the segments are substantially identical in construction and therefor interchangeable and to construct the segments in such a manner that they may be connected by links to provide a hinge arrangement which will insure proper radial and axial alignment of the segments when mounting the coupling on pipe ends.

Another object of the invention is to provide shoulders on the segments for engaging links of the hinge structure when the coupling parts are moved to the closed position to thereby insure proper radial alignment of the segments and to provide a toggle mechanism for releasably maintaining the coupling segments in a closed position by means of links which may be interchanged with the links providing the hinged structure.

Other objects and features of the invention will be more apparent as the present disclosure proceeds and upon consideration of the following detailed description and the accompanying drawing wherein an exemplary embodiment of the invention is disclosed.

Figure 1:
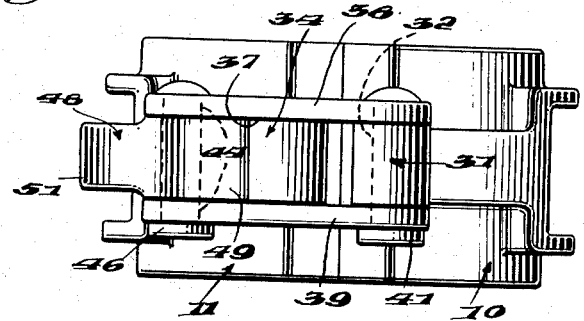
Fig. 1 is a plan view of a pipe coupling exhibiting the invention.

In carrying out the invention the coupling is of the type for embracing abutting or adjoining ends of two pipes. The coupling is adapted to embrace a gasket for engaging the peripheries of the pipes and providing a means for sealing the joint between the pipes. One of the advantageous features of the coupling is that both segments 10 and 11 are of identical construction so that in the manufacture of the device it is only necessary to provide one mold when the segments are formed in a die casting operation or to provide a single pattern when the half housing parts 10 and 11 are formed in a sand mold casting operation.

The coupling segment 10 extends circumferentially over approximately one hundred eighty degrees and is formed with a channel therein for receiving the gasket. This channel is more clearly illustrated at 12 in association with the coupling segment 11. The segment 10 is provided with a lug 14 at the lower end thereof. This lug 14 may be formed integral with the body portion of the segment 10 and an opening 15 extends therethrough. The ends 16 of the lug 14 are formed at right angles to the axis of the opening 15 to provide flat surfaces. A similar lug 18 is provided at the lower end of the housing segment 11 and this lug is likewise provided with an opening 19 for receiving a part of the hinged assembly connecting the lower ends of the segments 10 and 11. The end surfaces 21 of the lug 18 are also at right angles to the axis of the opening 19.

It will be noted that the axial dimensions of the body portions of the segments 10 and 11 which provide the channel 12 for receiving the gasket are materially greater than the axial dimensions of the lugs 14 and 18. A pair of shoulders 22 are provided on the lower end of the segment 10. One shoulder 22 is provided at each side of the lug 14. These shoulders are in the form of flat surfaces and lie in a plane which has a chord relationship to the circumference of the coupling. The lower end of the segment 11 is provided with similar flat shoulders 24 and these flat surfaces also lie in a chord relationship to the circumference of the coupling.

A pair of links 26 and 29 are provided connecting the lower ends of the segments 10 and 11 to each other. The links 26 and 29 are identical in construction and are formed as flat bars having openings in the ends thereof so spaced as to be aligned with the openings 15 and 19 in the lugs when the coupling parts are in the position shown in Fig. 2. A rivet or pin 27 extends through both of the links and the opening 15 in the lug 14. A similar rivet 28 extends through the openings in the links 26 and 29 and through the opening 19 in the lug 18. The flat inner surfaces of the links 26 and 29 lie in flat engagement with the ends 16 and the lug 14 and in flat engagement with the ends 21 of the lug 18. This arrangement provides for proper axial alignment of the segments 10 and 11 and this is of importance when the half housings are assembled around the pipe ends. The shoulders 22 and 24 provide abutment surfaces for the intermediate edge portions of the links 26 and 29 and the engagement of the surfaces 22 and 24 with the upper edges of the links insures proper radial alignment of the half housing sections 10 and 11 when the coupling parts are closed around the peripheries of two adjoining pipes.

A lug 31 is integral with the upper end of the segment 10. A hole 32 extends through the lug 31. The end surfaces of the lug 31 are parallel to each other and at right angles to the axis of the hole 32. It will be observed that the axial length of the lug 31 is less than the axial dimension of the segment 10. A similar lug 34 is integral with the upper end of the segment 11. This lug is provided with an opening 36. The end surfaces 37 of the lug 34 are arranged at right angles to the axis of the opening 36. The opening 36 does not serve a useful function in normal operation of the coupling but the segments 10 and 11 are identical and the opening 36 has utility when it is arranged on the right of the coupling and then provides means for connecting the toggle links thereto as hereinafter described.

Figure 2:
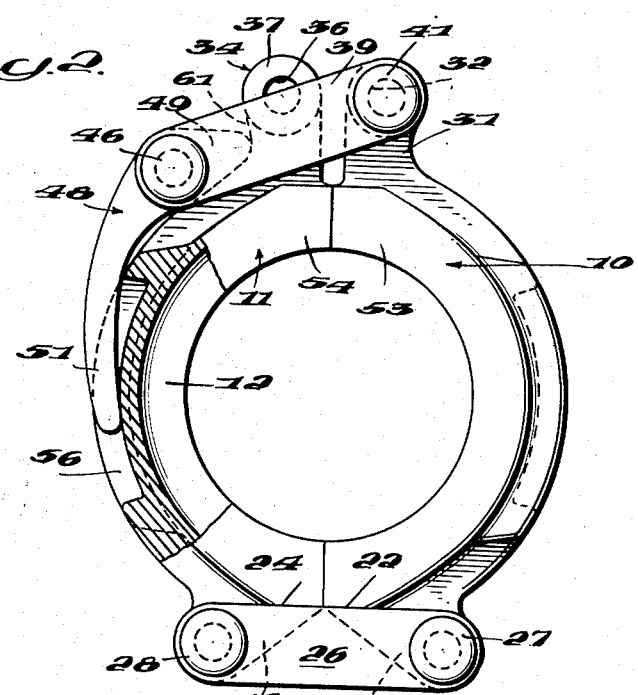
Fig. 2 is an end elevational view partly in section.
Figure 3:
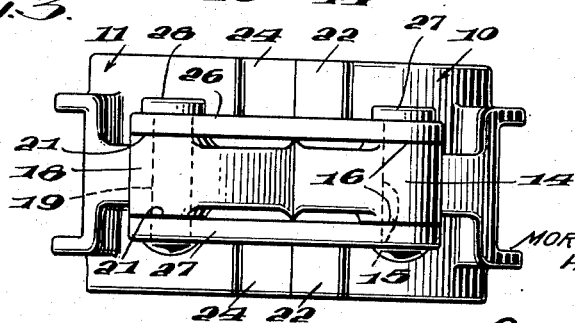
Fig. 3 is an inverted plan view showing the bottom portion of the coupling.

A pair of links 38 and 39 are pivotally connected to the lug 31 by means of a rivet or pin 41. The links 38 and 39 are substantially like the links at the lower end of the segments and lie in flat abutting relationship with the ends of the lug 31. The links 38 and 39 are free to turn about the axis of the pin or rivet 41. Aligned openings 44 are provided in the opposite ends of the links 38 and 39 for receiving a pin or rivet 46. A toggle member 48 is mounted for swinging movement on the pin 46 between the links 38 and 39. The toggle member 48 carries a nose portion 49 which is adapted to engage the lug 34 as shown in Figs. 1 and 2. A relatively long handle portion 51 is carried by the toggle member 48 to provide a lever arm for swinging the toggle member to the position shown in Fig. 2 and thereby drawing the upper end portions 53 and 54 into positions adjacent each other. It will be noted that when the free end of the handle 51 engages the segment 11 in the recess 56 the toggle nose portion 49 is substantially aligned with a line extending through centers of the rivets 41 and 46 so as to prevent unintentional separation of the upper ends of the segments. A concave surface 61 on the lug 34 is engaged by the nose portion of the toggle member.

In operation and when it is desired to arrange the coupling around adjoining pipe ends the toggle member is moved to a position to permit the links 38 and 39 to swing upwardly about the axis of the rivet 41. The lug 34 is then free of the toggle mechanism and the upper ends of the segments 10 and 11 may be moved away from each other. During this operation the lower ends of the segments 10 and 11 pivot about the axes of the rivets 27 and 28. The open coupling may then be arranged in position adjacent the adjoining pipes and the gasket and the upper ends of the segments 10 and 11 are moved towards each other. During this operation the links 26 and 29 engaging the end surfaces 16 and 21 of the lugs 14 and 18 maintain axial alignment of one hemi-cylindrical shaped section relative to the other. As the upper ends 53 and 54 are further moved towards each other the shoulders 22 and 24 engage the upper edges of the links 26 and 29 and provide for radial alignment of the two half sections of the coupling. The toggle member 48 is then turned in a counter-clockwise direction about the rivet 46 after the links 38 and 39 are moved downwardly over the lug 34. The toggle nose 49 then engages the concave portion 61 of the lug 34 so that further counter-clockwise movement of the toggle handle 51 will urge the upper ends of the coupling towards each other.

While the invention has been shown and described with reference to specific structural features it will be appreciated that changes may be made in the elements as well as the general organization. Such modifications and others may be made without departing from the spirit and scope of the invention set forth in the appended claim.

What I claim and desire to secure by Letters Patent is:

In a pipe coupling, a generally hemi-cylindrical shaped segment having an inner form concave in cross section, a lug carried by said segment adjacent one end and spaced rearwardly therefrom, a flat surface on the segment between the lug and the end of the segment lying in a chordal plane with respect to the center of said segment, a second hemi-cylindrical shaped segment identical in shape to said first segment, a lug carried by said second segment adjacent one end and spaced rearwardly therefrom, a flat surface on the second segment between the second lug and the end of the second segment lying in a chordal plane with respect to the center of the second segment, a link pivotally connected to each lug to provide a hinge for both segments, an intermediate flat edge on said link adapted to be engaged by both of said flat surfaces when the segments are hinged to a closed position to position one segment in radial alignment with the other, and means for retaining said segments in said closed position.

MORTON C. HUTCHINSON.

References Cited in the file of this patent

UNITED STATES PATENTS

| Number | Name | Date |
|---|---|---|
| 1,290,590 | Lethew | Jan. 7, 1919 |
| 1,790,225 | Campbell | Jan. 27, 1931 |
| 2,178,819 | Timm | Nov. 7, 1939 |

FOREIGN PATENTS

| Number | Country | Date |
|---|---|---|
| 412,186 | Great Britain | June 19, 1934 |